Aug. 25, 1942.   A. JOABSON   2,293,755
FISHING REEL
Original Filed April 5, 1937
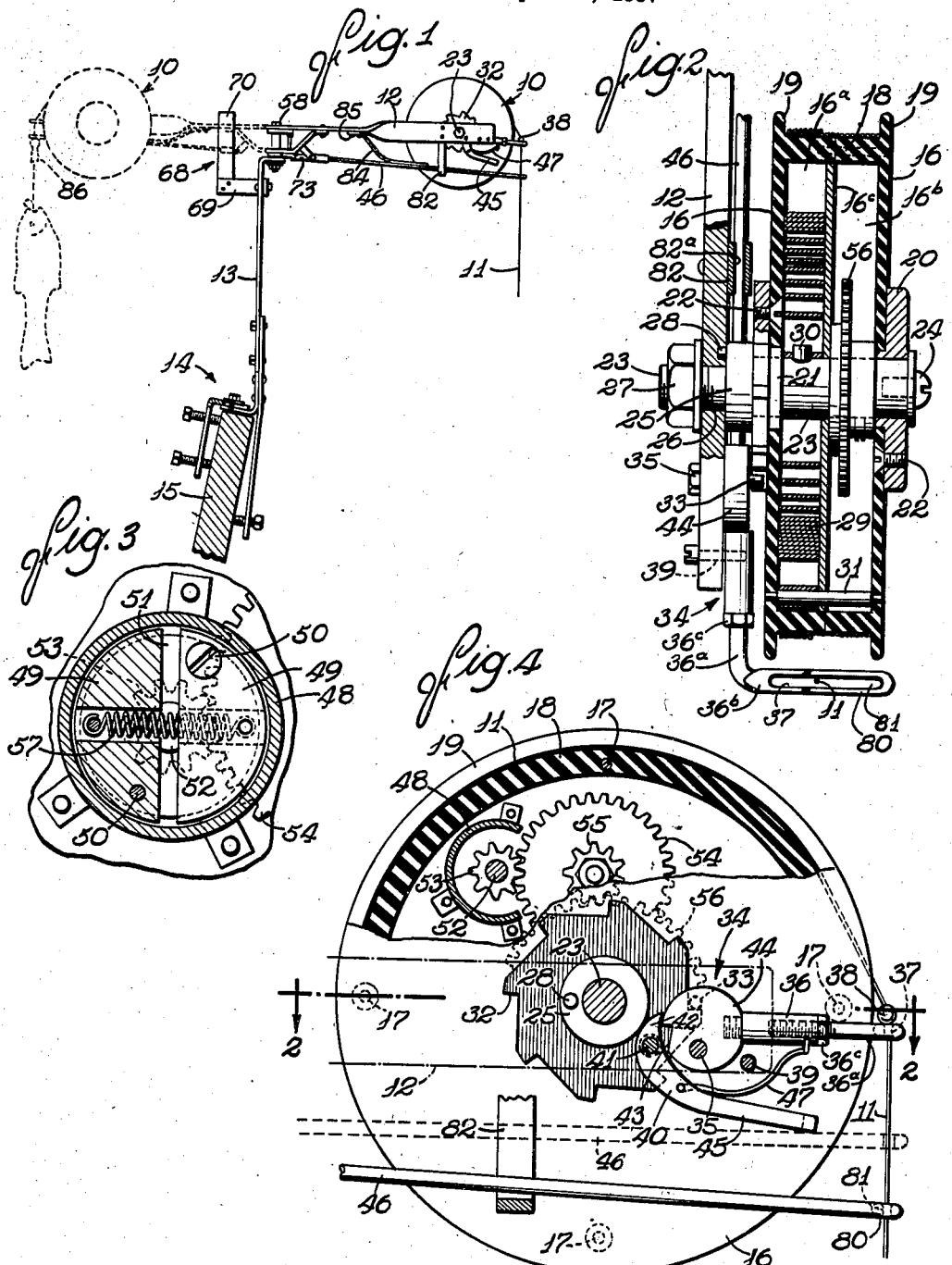
INVENTOR
Arthur Joabson
ATTORNEYS Patented Aug. 25, 1942

2,293,755

UNITED STATES PATENT OFFICE 2,293,755

FISHING REEL

Arthur Joabson, Chicago, Ill.

Original application April 5, 1937, Serial No. 134,934. Divided and this application November 8, 1939, Serial No. 303,355

8 Claims. (Cl. 242—107)

The invention relates to fishing devices and has more particular reference to an improved reel automatically operative in response to a pull on the line to cause the latter to be reeled in; this application being a division of my copending application Serial No. 134,934, filed April 5, 1937, issued as Patent No. 2,194,088.

One object of the invention is to provide a device of the character stated, an automatic reel of new and improved construction which includes means for storing energy as the line is paid up for setting the device for operation, and for subsequent use in reeling in a hooked fish.

Another object is to provide a novel governor means for preventing excessive speed of movement of the reel and line.

Other objects and advantages will become apparent in the following description and from the accompanying drawing, in which:

Figure 1 is a view in elevation of an automatic fishing device embodying the improved reel.

Fig. 2 is a fragmentary sectional view substantially along line 2—2 of Fig. 4.

Fig. 3 is a fragmentary sectional view of a governor for preventing excessive reel speed.

Fig. 4 is an enlarged fragmentary view of the device in a "set" position with part of the reel broken away to show the underlying construction.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For purposes of illustration I have shown my invention as embodied in an automatic fish catching apparatus of the type disclosed and claimed in my said copending application. As shown in Fig. 1, the improved reel 10 carrying a fishing line 11 is mounted upon an elongated support 12, which in turn is mounted for swinging movement in a horizontal plane, whereby the reel may be disposed either (as indicated in full outline) over the water, or (as indicated in dotted outline) over a boat, pier or other suitable landing point. Adjustable clamping means, generally indicated at 14, may be provided for fastening the vertical support to a gunwale 15 of a boat or the like.

Referring to Figs. 2 and 4 the reel shown therein comprises complementary disk-like members 16 having annular flanges adapted to be brought into juxtaposition and be secured together by screws 17 to form a drum 18. The peripheral edges of the members extend beyond the flanges as at 19 to confine the fishing line 11 wound on the drum. The interior of the reel is separated into a spring compartment 16ª and a governor compartment 16ᵇ by a flat circular partition 16ᶜ disposed radially of the axis of the drum. For rotatably mounting the reel on the support, bearing members 20 and 21 are secured to the disks 16 as by screws 22, and are axially apertured rotatably to receive a shaft 23 which extends through a bore 26 in the support 12 and is firmly secured thereto by a nut 27. Axial movement of the reel on the shaft is limited in one direction (to the right in Fig. 2) by a screw and washer 24 secured to the free end of the shaft. Similar movement in the opposite direction is prevented by a collar 25 integral with the shaft. A pin 28, extending from the collar 25 into a cooperating socket in the support, provides means for holding the shaft against rotation relative to the support.

Means is provided for storing energy as the reel is rotated in a direction to pay out the line. Herein this means comprises a spiral spring 29 confined within the spring compartment 16ª and secured to the shaft at one end, as at 30, and to the drum at its other end, as by a pin 31. The spring is arranged so that rotation of the reel in a clockwise direction (see Fig. 4) to pay out the line will place the spring under tension. Reverse or winding-in action of the reel, under the influence of the spring after the line is paid out a desired distance, is temporarily restrained by readily releasable mechanism which is capable of being tripped by the pull of a hooked fish on the line. In the instant embodiment a ratchet and pawl mechanism is employed for this purpose and ratchet teeth 32 may be formed on the rim of the bearing member 21 for coaction with a pawl 33 arranged releasably to engage the ratchet teeth to prevent movement of the reel by spring action.

For the purpose of releasing the reel to the rewinding force of the spring after the device has been set for operation, the pawl is mounted on a lever 34 arranged to be actuated by a pull or jerk on the line to displace the pawl from the ratchet. The lever in this instance includes a disk 44, which is eccentrically pivoted on the support as at 35, and carries the pawl 33 in the form of a pin at a distance from the pivotal point. A tubular arm 36 screw threaded into said disk extends radially therefrom toward the adjacent periphery of the reel, and an extension 36ª screw threaded into the arm is adjustably secured thereto by a lock nut 36ᶜ. An angular portion 36ᵇ of the extension 36ª extends parallel to the surface of the drum outwardly thereof and is arranged to entrain the line by such means as a slot 37 therein through which the line is threaded.

A slidable obstruction 38 on the line is shiftable along the line to a position resting on or adjacent to the angular portion 36ᵇ of the lever. A small rubber ball having a sufficient frictional grip on the line to maintain its relative position when the line is pulled has been found suitable. When the device is "set" in operative condition for catching fish the lever 34 is in a raised position (as indicated in Fig. 4), the pawl and ratchet being held in engagement by the force exerted by the tensioned spring. Now if the line is pulled, as by a hooked fish, the rubber ball will move the lever downwardly to free the pawl from the ratchet and release the reel to the rewinding action of the spring.

The relationship of the pawl 33, the lever 34 and the pivotal point 35 of the lever as shown in Fig. 4, provides a trip mechanism which will remain in its set position yet is quite sensitive to a pull on the line.

After release the lever 34 will normally rest, by its own weight, against a stop 39 extending from the support. As the line is drawn in through the slot 37 during a rewind operation the lever might be carried upwardly to reengage the pawl with the ratchet. This would relieve the tension on the line and possibly result in a loss of the fish. To avoid this difficulty, means is provided for latching the pawl against accidental reengagement. Thus a lever 40 is pivoted on a stud 41 on the support and has a wedge shaped end 42 arranged to engage a notch 43 in the disk when the pawl is in its released position. When the device is "set" the wedge shaped end 42 is held against the periphery of the disk, as illustrated in Fig. 4 by the weight of an arm 45 located on the same side of the pivot as the end 42 and extending downwardly and outwardly of the support. As the disk is rotated in a clockwise direction to displace the pawl from the ratchet the end 42 of the lever will drop into engagement with the notch 43 and prevent the line from dragging the lever 34 upwardly. The arm 45 has another function to be presently described.

In order to prevent excessive speed of rotation of the reel, a governing device is provided and this device may be suitably confined within the governor compartment 16ᵇ. Referring to Figs. 3 and 4, a cylindrical brake drum 48 is secured to one of the disks 16 of the reel housing. A pair of brake shoes 49 of generally semi-circular shape are dimensioned to be placed in the drum in diametrical opposition and together form a divided disk, the peripheral surface of which is adjacent to the inner surface of the brake drum. Each shoe is separately and eccentrically pivoted, as at 50, to a plate 51 which is fixed on a shaft 52 rotatably mounted on the reel housing. A speed multiplying gear train in the governor compartment drives the shaft 52 from the shaft 23 as relative motion between the reel and the shaft 23 occurs, the gears being designated by the numerals 53, 54, 55 and 56. A tension spring 57 connected to both shoes normally hold them disengaged from the drum. When the shoes are rotated they are urged apart by centrifugal force and at or above a predetermined critical speed will drag on the drum. Excessive speed of the reel is thereby prevented.

The reel is mounted for swinging movement upon the support 13 and automatically swung from an outboard or set position to an inboard or landing position by any suitable means such, for example, as that disclosed in my said copending application.

Briefly stated the horizontal support 12 is mounted on the upper end of the vertical support 13 for movement about a vertical axis defined by a pivot pin 58. 68 designates a stop comprising an arm 69 secured to the vertical support 13 and a yieldable stop member 70 engageable by the arm 12 when the reel is swung into its inboard or landing position. Spring means (not shown) associated with the pivot pin 58 is tensioned when the arm 12 is swung to its outboard position and becomes operative when the line is wound in to swing the reel from its outboard or set position into its landing position. The reel is normally held in its set position by latch means including a latch member 73 (Fig. 1) engageable with the support 13 and operative by means of a rod 46 (Figs. 1 and 2) which extends along and beneath the support 12 and terminates in an angularly bent end 80 (Fig. 2) underlying the slotted portion 36ᵇ carried by the tubular arm 36, said underlying bent end 80 having a slot 81 therein to entrain the line. A flat spring 84 secured to the reel supporting arm 12 as at 85 engages the rod 46 to maintain the latch 73 in holding engagement with the support 13.

In the act of setting the apparatus for operation the lever assembly and the support are grasped by the fisherman. This moves the lever assembly toward the support and the support is free to be swung to set position. At the same time the pawl and ratchet mechanism is conditioned to allow the line to be paid out but to prevent rewinding thereof. Thus the parts are so arranged that the rod 46 in its upward movement engages and moves the arm 45 (as indicated in dotted outline in Fig. 4) to release the wedge shaped end 42 of the lever 40 from the notch in the disk 44. A spring 47 (see Figs. 1 and 4) fixed to the arm 45 loosely engages at its free end a part of the pawl assembly 34 and urges the pawl yieldably into engagement with the ratchet teeth. The reel is now in condition for manually paying out the line. When the line has been paid out to a sufficient extent the stop 38 is shifted to a position adjacent to the angular portion 36ᵇ of the pawl lever. The reel support may then be rotated to a position extending over the water. If the lever arm 46 is now released the latch or detent means 73 will engage to maintain the support in "set" position as illustrated in solid outline in Fig. 1.

When a fish has been hooked, the pull on the line releases the pawl from the ratchet, and the energy stored in the spring is automatically released to rotate the reel in a direction to wind up the line. Accidental reengagement of the pawl is prevented by engagement of the wedge end 42 of the lever 40 with the notch in the disk 44. The spring keeps a constant strain on the line automatically "playing" the fish until it is finally wound in. Excessive speed of movement of the reel and line during this time is prevented by the governor. When the fish bait or any other obstruction (indicated at 86) adjacent the free end of the line strikes the lever arm 46, the latch device 73 is released and the reel is automatically swung to its normal position against the stop 68, thus landing the fish. If the fish has not been properly hooked, the initial pull on the line releases the reel holding means and the loose line is reeled in and swung to a position convenient for inspection or rebaiting.

It will be understood that the means for automatically swinging the reel from its set position to its landing position forms no part of the present invention, the same being claimed in my said copending application. Accordingly it is deemed unnecessary to illustrate and describe this structure in detail, reference being made to said application for a more complete disclosure.

I claim as my invention:

1. In a fishing reel, the combination of a shaft, a reel drum, means for rotatably supporting said drum on said shaft including a bearing having a radially extending flange provided with ratchet teeth, means for imposing a force on said drum to drive it in one direction, a lever mounted for pivotal movement adjacent said flange and having a projection frictionally maintained in engagement with said ratchet teeth by the force imposing means only to restrain said drum against movement by the force imposing means, said lever when free seeking a gravity position in which said projection is disengaged from said ratchet teeth.

2. An automatic fishing device having, in combination, a reel, a spring connected therewith and adapted for storing energy as a fishing line associated with said reel is paid out, detent means for preventing reverse action of said reel and disengageable by a pull on the line, latching means engageable with the detent means for maintaining the detent means disengaged, and yieldable means associated with said latching means for urging said detent means into holding engagement with said reel when said latching means is actuated to release its engagement with said detent means.

3. A fishing device having, in combination, a reel adapted for storing energy as an associated fishing line is paid out, means for restraining reverse action of said reel including normally disengaged ratchet and pawl means, a releasable latch for preventing the engagement of said pawl with said ratchet, a spring attached to said latch and cooperable with said pawl for yieldably forcing said pawl into engagement with said ratchet only when said latch is moved in pawl releasing direction.

4. An automatic fishing device having, in combination, a support, a reel rotatably mounted thereon, a fishing line on said reel, spring means operative between said support and said reel for imparting rotation to the reel, a governing mechanism arranged to prevent excessive speed of rotation of the reel, said governing mechanism including a rotatable plate, a cylindrical brake drum secured to the reel, semi-cylindrical shoes eccentrically pivoted on said plate and disposed substantially concentrically of and within said drum so that said shoes will drag on said drum as the plate is rotated at greater than a predetermined critical speed, and a gear train connecting said plate with a stationary element of the support.

5. A fishing device having, in combination, a reel adapted for storing energy as an associated fishing line is paid out, releasable detent means for holding said reel against the force of the stored energy, a releasable latch engageable with said detent means for preventing reengagement of said detent means after it has been released, said latch including means cooperable with said detent means for forcing said detent means into holding engagement with said reel upon movement release of said latch in a releasing direction, and a control member including a part convenient to the grasp of the operater in setting the device and movable to effect release of said latch and engagement of said detent with said reel.

6. A fishing device having, in combination, a reel adapted for storing energy as an associated fishing line is paid out, detent means engageable with said reel for restraining reverse action thereof, a releasable latch for preventing the engagement of said detent means with said reel, and spring means associated with said latch and cooperable with said detent means upon movement of said latch in a releasing direction to yieldably urge said detent means into engagement with said reel.

7. A fishing device having, in combination, a support, a reel rotatably mounted on said support, a fishing line on said reel, driving means for urging said reel in one rotational direction, governor means arranged to prevent excessive speed of rotation of said reel, said governor means including a brake drum secured to the reel, a centrifugal element arranged for frictional contact with said drum upon rotation thereof above a predetermined critical speed, and a multiplying gear train connected between said centrifugal element and said support for driving said element by relative rotational movement between said reel and said support.

8. In a fishing device, the combination of a support, a non-rotatable shaft on said support, a hollow reel rotatably mounted on said shaft, said reel having two compartments, a spring housed within one of said compartments and connected between said shaft and said reel for imparting rotational movement to said reel, speed governing means housed within the other compartment, and a multiplying gear train connected between said governor means and said shaft for driving said governor means by relative rotational movement between said reel and said support.

ARTHUR JOABSON.